UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

FLAME-EXTINGUISHING MATERIAL.

1,085,783.  Specification of Letters Patent.  Patented Feb. 3, 1914.

No Drawing.  Application filed February 24, 1911. Serial No. 610,455.

*To all whom it may concern:*

Be it known that I, JONAS W. AYLSWORTH, a citizen of the United States, and a resident of East Orange, New Jersey, have invented certain new and useful Improvements in Flame-Extinguishing Material, of which the following is a specification.

My invention relates to an improved fire extinguishing agent adapted to be used for the impregnation of cotton, textile fabrics, wood for furniture, buildings, etc. and also for the preparation of fire extinguishing fluids for use in automatic sprinkling systems hand grenades and the like. The substance may also be prepared in the form of dry salts. Fabrics or materials coated or impregnated with the improved composition in addition to having flame extinguishing properties may likewise be given water repellent qualities and rendered aseptic against the ravaging of insects, vegetable growths and the like, because of the valuable qualities of the impregnating substance.

The object of my invention is to produce as an article of manufacture a substance of the character referred to, to produce fibrous or cellulose structures impregnated with such a substance and to provide suitable processes for producing such productions.

My invention is based on a recognition of the valuable properties of certain of the higher halogen substitution products of carbocyclic compounds which form acids capable of forming stable salts with alkaline bases and metals and with ammonia. The preferred substances of this character are certain of the higher substitution products of phenols and cresols, such as tetra-chloro-phenol $$(C_6Cl_4HOH);$$

penta-chloro-phenol $$(C_6Cl_5OH),$$

and perchloro-phenol $$(C_6Cl_5OCl);$$

tetra-chloro-cresol $$(C_6Cl_4CH_3OH);$$

tri-chloro-phthalic acid $$[C_6Cl_3H(COOH)_2],$$

and tetra-chloro-phthalic acid $$[C_6Cl_4(COOH)_2].$$

These substances are particularly efficient because they form soluble salts with potash and soda, which allows of their use in water solution and for applying in other ways which will hereinafter be described. These bodies form soluble salts with the fixed alkalis and insoluble or difficultly soluble salts with most of the basic metals, and insoluble to difficultly soluble salts with ammonia. The advantages of these bodies over halogen substitution products which have heretofore been proposed for the purposes of fire extinguishers and for rendering cellulose fabrics non-inflammable lies in the property of these bodies that water soluble salts may be prepared therefrom and used as such or in combination with other well-known inorganic water soluble salts, thus combining desirable qualities of both classes of substances. These acid halogen substitution bodies yield flame extinguishing fumes at from 400° F. to 700° F., and the mineral salts which may be used therewith serve to coat the combustible fabric and thus retard combustion of the same.

When it is desired to make a non-inflammable cellulose fabric which will also be proof against moisture, according to my invention I may proceed as follows: The thread, fiber or fabric is preferably first treated with a solution which will swell the fibers, such a solution being one of a caustic alkali, zinc chlorid solution, or moderately concentrated sulfuric acid. After washing the fabric to remove the swelling agent, the substance is soaked in a concentrated solution of the potash or soda salt of the acidic halogen substitution product used. The excess solution is removed by wringers or by centrifugal machines, after which the article may be dried or may be further treated without drying. When further treated, a solution of a metallic salt may be used, or a dilute acid. If the substance is soaked in the metallic salt solution, the latter will precipitate an insoluble salt of the halogen substitution product within the cells or pores of the substance being impregnated. If the dilute acid is used in the treatment, the acidic halogen substitution product alone will thus be precipitated within the pores of the substance. After this treatment the fibrous body or fabric is washed free of the soluble salts and is dried for use.

Among the metallic salts which may be used, as just stated, the salts of lead, zinc, calcium, barium and aluminum may be named. The greatest degree of non-inflammability, however, is attained by incorporating with the alkaline solution of the organic halogen acid a metallic salt which will yield a precipitate which is readily fusible or will form a good coating film on the charred fabric. Salts of this character are tungstate of soda, borate of soda, fluorid of soda, phosphate of soda, molybdate of soda and silicate of soda. When these are used, a precipitate is obtained of the mineral salt used together with a precipitate of the chloro-acid.

For a fire extinguishing liquid for use in hand grenades, sprinkler systems and the like, solution of the potash or soda salts of tetra- or penta-chloro phenol or of tri- or tetra-chloro-phthalic acid may be used alone or in combination with the well-known water soluble mineral salts which are used for this purpose, such as bicarbonate of soda, borax, silicate of soda, etc. The solution may be of any desired concentration up to the saturation point, which for the potash salt of penta-chloro-phenol is about 15% at 60° Fah. and 25% when hot.

Besides being fire resisting, fibers and fabrics which are treated as described with the higher halogen substitution acids or salts thereof are rendered permanently aseptic and secure from the ravages of insects and fungus growths and are rendered waterproof, when the insoluble salts are precipitated within the cells of the fabric.

The fabric may be dyed before or at the same time as its impregnation or after the impregnation, depending on the nature of the dye. When it is dyed simultaneously with the impregnation or before the same, the insoluble precipitates of the halogen substitution acids form a mordant for the dye.

In addition to the fire extinguishing liquid described above, my invention may be used in dry state for fire extinguishing purposes. For this use the chloro-phenol and phthalic acids as described, and their salts, may be used in the dry state, either alone or in combination with other salts.

When wood is to be treated, the concentrated solution of the alkali salts of any desired one of the chloro-phenolic or chloro-phthalic acids mentioned is run into the chamber containing the wood, the wood having previously been subjected to a vacuum treatment to remove the air from its pores or cells. The solution is forced into the pores of the wood by pressure. If it is desider to fill the pores with insoluble salts, the wood may be dried after the treatment just described and the air or water vapors exhausted therefrom in a vacuum chamber. A metallic salt solution such as aluminum or calcium chlorid or other salts may be run into the chamber and forced into the wood by pressure. The solution may be heated during the treatment and the concentration of the solution may be so balanced that just a sufficient amount of the salt may be taken into the wood to form therein the desired precipitate.

Wood impregnated with the copper salts of the halogen substitution acids, is particularly efficient for marine structures, such as docks, piling and boats, because of the non-inflammability above the water line of wood so treated, and the property of the same to resist barnacles and other destructive forms of marine life.

It will be noted that in each of the examples given of the forms of halogenized substitution products of carbocyclic compounds, one-half or more of the hydrogen directly attached to the carbon of the closed chain is replaced by the halogen, and that also the structure so formed has attached thereto one or more hydroxyl or carboxylic groups, thus forming an acid. Since half or more than half of the hydrogen atoms directly attached to the carbon of the closed chain are replaced by halogen, I refer in the claims to these products as higher halogen substitution products.

It should be understood that in the following claims the words "acidic carbo-cyclic halogen substitution compound" and "halogenated phenolic compound," are intended to cover generically both the halogen substitution products of organic acids and the salts thereof, and the higher halogen substitution products of phenols and the salts thereof, respectively, which I have previously described.

Having now described my invention, what I claim as new and desire to secure by Letters Patent, is as follows:

1. As a new article of manufacture, a fibrous or cellular body impregnated with a higher halogenated phenolic compound, substantially as described.

2. As a new article of manufacture, a fibrous or cellular body impregnated with insoluble metallic salts of a higher halogen substitution product of a carbocyclic compound, substantially as described.

3. As a new article of manufacture, a fibrous or cellular body impregnated with insoluble metallic salts of a higher halogen substitution product, of a phenol, substantially as described.

4. The process of treating fibers and fabrics to render the same non-inflammable and water repellent, which comprises impregnating the structure with a water soluble salt of a higher halogen substitution product of a carbocyclic compound, substantially as described.

5. The process of treating fibers and fabrics to render the same non-inflammable and water repellent, consisting in impregnating the structure with a water soluble salt of a higher halogen substitution product of a phenol and then further treating the fiber or fabric to precipitate a higher halogenated phenolic compound within the cells or interstices thereof, substantially as described.

6. The process of treating fibers and fabrics to render the same non-inflammable and water repellent, which comprises forming insoluble metallic salts of a higher halogen substitution product of a carbocyclic compound within the pores of the structure, substantially as described.

7. The process of treating fibers and fabrics to render the same non-inflammable and water repellent, consisting in swelling the fibers of the substance and impregnating the same while swollen with a water soluble salt of a higher halogen substitution product of a carbocyclic compound, substantially as described.

8. The process of treating fibers and fabrics to render the same non-inflammable and water repellent, which comprises swelling the fibers of the substance with a suitable agent, washing out the agent, soaking the substance in a solution of alkali salt of an acidic organic higher halogen substitution product, and removing the excess solution after impregnation, substantially as described.

9. The process of treating fibers and fabrics to render the same non-inflammable and water repellent, consisting in swelling the fibers of the substance with a suitable agent, washing out the agent, soaking the substance in a solution of an alkali salt of an acidic organic higher halogen substitution product, removing the excess solution after impregnation, and treating the substance with a solution of a metallic salt which will precipitate an insoluble salt of the substitution product within the cells or interstices of the fiber, substantially as described.

10. The process of treating fibers and fabrics to render the same non-inflammable and water repellent, which comprises swelling the fibers of the substance and impregnating the same while swollen with a water soluble salt of a higher chlorin substitution product of a phenol, substantially as described.

11. The process of treating a fibrous cellular structure to render the same non-inflammable and water repellent, which comprises removing air from the pores or cells of the structure and forcing therein a solution of alkali salts of a higher halogen substitution product of a carbocyclic compound, substantially as described.

12. The process of treating a fibrous cellular structure to render the same non-inflammable and water repellent, consisting in removing air from the pores or cells of the structure and forcing therein a solution of alkali salts of a higher halogen substitution product of a carbocyclic compound, drying the substance, removing vapors therefrom, and forcing a solution of a metallic salt into the structure, to form an insoluble precipitate of the substitution product within the cells or interstices of the structure, substantially as described.

This specification signed and witnessed this 18th day of February 1911.

JONAS W. AYLSWORTH.

Witnesses:
ANNA R. KLEHM,
CLARENCE CHURCHILL.